W. V. TURNER.
FLUID PRESSURE BRAKE.
APPLICATION FILED JULY 1, 1907.
988,604.
Patented Apr. 4, 1911.
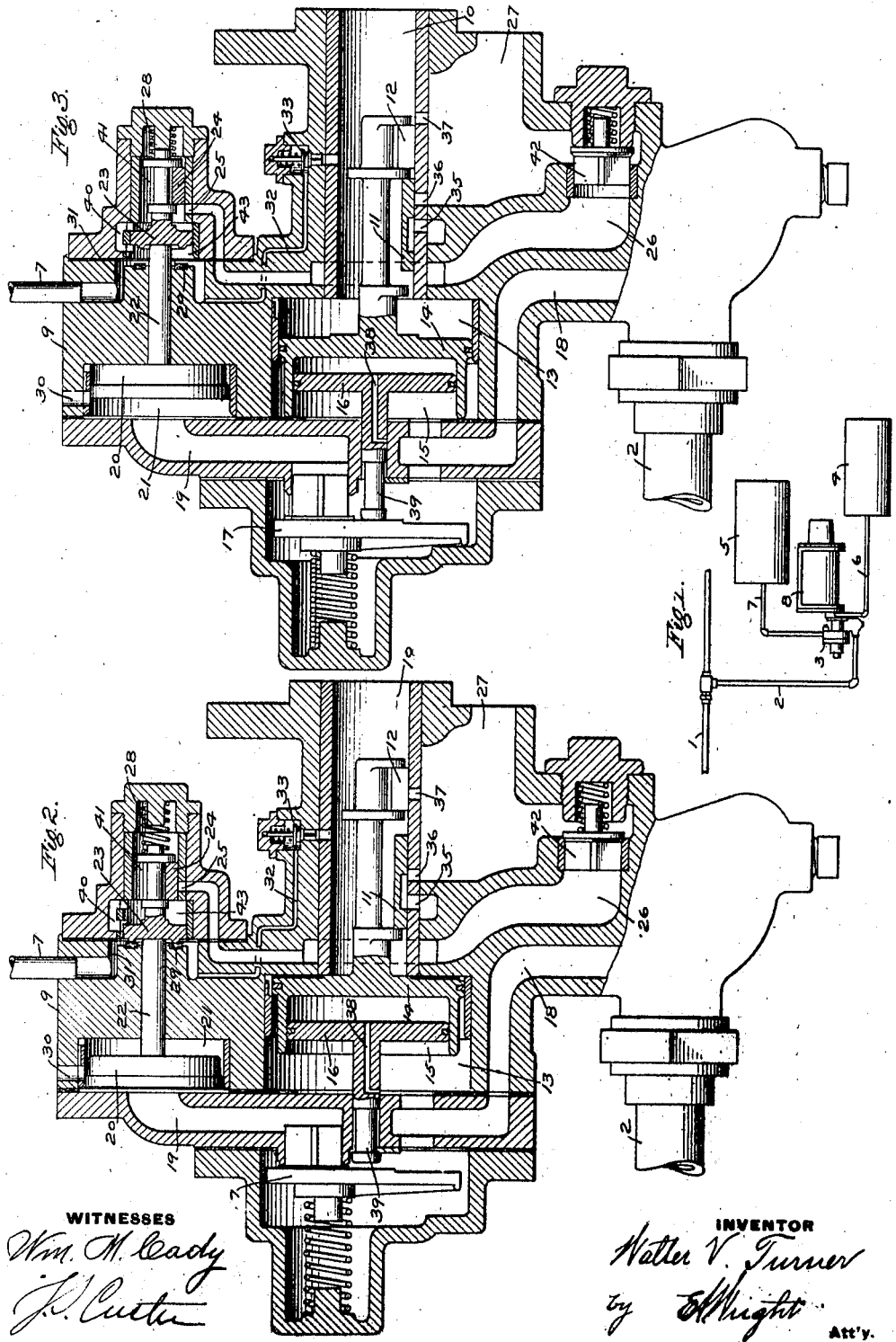
WITNESSES
INVENTOR

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

988,604.  Specification of Letters Patent.  Patented Apr. 4, 1911.

Application filed July 1, 1907. Serial No. 381,774.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and particularly to the emergency feature of a triple valve of the form wherein the train pipe is vented to the atmosphere to cause a local reduction in train pipe pressure in an emergency application of the brakes, and wherein the flow of air from the train pipe through the emergency vent valve actuates an emergency valve device to open a communication from a reservoir or source of fluid pressure to the brake cylinder. In prior constructions of this character, the train pipe vent valve is liable to close, so that the flow of train pipe fluid is cut off from the emergency valve device, thereby permitting the emergency valve to return and close the communication between the reservoir and brake cylinder, before the reservoir and brake cylinder pressures have fully equalized. This is particularly true where a supplemental reservoir or other additional source of pressure is employed to supply fluid to the brake cylinder to augment the brake cylinder pressure, as such reservoir is usually of large capacity and consequently requires considerable time to equalize with the brake cylinder pressure.

The principal object of my invention is therefore, to provide means adapted to hold the emergency valve open until the reservoir and brake cylinder pressures have substantially equalized.

In the accompanying drawings, Figure 1 is a diagrammatic elevational view of a car air brake equipment, with my improvements applied thereto; Fig. 2 a central sectional view of a triple valve device, embodying one form of my invention and showing the parts in full release position and Fig. 3 a similar view, showing the parts in emergency application position. As shown in Fig. 1, the car equipment may comprise a train pipe 1, connected by branch pipe 2 with a triple valve device 3, an auxiliary reservoir 4, supplemental reservoir 5, connected respectively by pipes 6 and 7 to the triple valve device 3, and a brake cylinder 8.

For the purpose of illustrating the application of my invention, the same is shown in the drawings, as applied to a type of triple valve known as the "New York", but it will be understood that the invention is also adapted to other types of triple valves, wherein quick action is secured by venting fluid from the train pipe to the atmosphere in emergency applications of the brakes. Such a triple valve may comprise, as shown in the drawings, a casing 9, having a valve chamber 10 containing slide valves 11 and 12 for controlling the exhaust and admission of fluid from and to the brake cylinder, and a main actuating piston 14, contained in a piston chamber 13. The main piston has a piston chamber 15 which contains an emergency piston 16, adapted to actuate a train pipe vent valve 17 in emergency applications of the brakes. A passage 19 leads from said vent valve 17 to an abutment 20, provided with a stem 22 for actuating an emergency valve 24, contained in valve chamber 41 and controlling a port 25, leading to passage 26 and through check valve 42 to brake cylinder passage 27 and the brake cylinder. A spring 28 tends to maintain the valve 24 closed and the abutment 20 in its outer position. The pipe 7 from the supplemental reservoir 5 opens into an annular passage 31, which may be provided with a charging passage 32, leading from the main valve chamber 10 and the auxiliary reservoir. The charging passage 32 being preferably provided with a check valve 33, to prevent back flow to the auxiliary reservoir. According to a preferred construction of my invention the valve 24 is provided with an operating abutment 23, contained in a piston chamber 43, and normally held to its seat on a gasket 29 by said spring 28, so as to prevent leakage of fluid around the stem 22.

In full release position of the parts, air from the train pipe flows through the usual feed groove around the main piston 14 to the valve chamber 10 and auxiliary reservoir, and thence past check valve 33 to passage 32, passage 31 and pipe 7 to the supplemental reservoir, charging the same to the standard train pipe pressure. The annular passage 31 is also in open communication in this position around the abutment 23 with the emergency valve chamber 41 so that the opposing fluid pressures on abutment 23 are normally equalized.

A service application is made in the usual manner by causing a gradual reduction in train pipe pressure, and the main piston is thereupon shifted by auxiliary reservoir pressure to its outer position, closing the brake cylinder exhaust and opening brake cylinder port 37 to the auxiliary reservoir. The gradual movement of the main piston permits the fluid between the main piston and the emergency piston 16 to flow out through a passage 38 in the stem 39, so that the piston 16 and stem 39 are not moved to open the train pipe vent valve 17.

In an emergency application of the brakes however, the sudden reduction in train pipe pressure, causes the main piston to shift quickly, and as the fluid between the pistons is unable to flow out of the small passage 38 fast enough, the emergency piston is also shifted, closing the passage 38, and on the further movement thereof, the stem 39 opens the vent valve 17, and train pipe air flows into passage 19 and on to abutment 20, which is thereupon shifted to its inner position, uncovering vent port 30, so that the fluid from the train pipe flows to the atmosphere. The inward movement of the abutment 20, through the stem 22 shifts the abutment 23 and the valve 24 so as to open port 25, thus permitting fluid from the supplemental reservoir to flow to the brake cylinder. In this position of the valve 24, as shown in Fig. 3, the piston 23 opens by pass 40 around it, and fluid continues to flow to the brake cylinder until the pressure in the brake cylinder on the inner face of said piston 23, and the supplemental reservoir pressure on the outer face thereof, have substantially equalized, then the spring 28 shifts the valve 24 and closes port 25. It will now be apparent that the valve 24 will be held open independently of the abutment 20, and that the valve will remain open until substantial equalization of pressure has taken place. The triple valve device, may of course, be also provided with a similar emergency valve mechanism for governing communication from the usual auxiliary reservoir to the brake cylinder and such mechanism may likewise be provided with my improvement for maintaining communication open from the auxiliary reservoir to the brake cylinder, if desired.

Having now described my invention, what I claim as new and desire to secure by Letters Patent is:

1. In a fluid pressure brake, the combination with a train pipe, reservoir and brake cylinder, of a vent valve mechanism operating upon a reduction in train pipe pressure for venting air from the train pipe, an emergency valve device operated by the flow of air vented from the train pipe to open communication from the reservoir to the brake cylinder, and means for holding said emergency valve device open until the pressures in the reservoir and brake cylinder have substantially equalized.

2. In a fluid pressure brake, the combination with a train pipe, reservoir and brake cylinder, of a valve mechanism operating upon a sudden reduction in train pipe pressure for venting air from the train pipe, an emergency valve device operated by the flow of air from said vent valve mechanism to open communication from the reservoir to the brake cylinder, and means for holding said emergency valve device in the open position until the pressures of the reservoir and brake cylinder substantially equalize and for then shifting the valve device to close said communication.

3. In a fluid pressure brake, the combination with a train pipe, reservoir and brake cylinder, of a vent valve operating under a reduction in train pipe pressure for releasing air from the train pipe, an emergency valve device operated by the flow of air from said vent valve to open communication from the reservoir to the brake cylinder, and having means subject to brake cylinder pressure for governing the closing of said valve.

4. In a fluid pressure brake, the combination with a train pipe, reservoir and brake cylinder, of a valve mechanism operating under a sudden reduction in train pipe pressure for venting air from the train pipe, an emergency valve device operated by the flow of air vented from the train pipe to open communication from the reservoir to the brake cylinder, and having means subject to the opposing pressures of the brake cylinder and said reservoir for controlling the closing of said valve mechanism.

5. In a fluid pressure brake, the combination with a train pipe, reservoir and brake cylinder, of a valve operating under a reduction in train pipe pressure for venting air from the train pipe, an emergency valve for controlling communication between said reservoir and brake cylinder, a movable abutment operated by the flow of air from said vent valve for shifting said emergency valve to open communication from the reservoir to the brake cylinder, and means for holding the emergency valve open until the pressures of the reservoir and brake cylinder substantially equalize.

6. In a fluid pressure brake, the combination with a train pipe, reservoir and brake cylinder, of a vent valve operating under a reduction in train pipe pressure for releasing air from the train pipe, an emergency valve for controlling communication between said reservoir and brake cylinder, an actuating abutment therefor, operated by the flow of air from said vent valve to shift said valve and open said communication between the reservoir and brake cylinder, and an abutment subject to the opposing pressures of the reservoir and brake cylinder for controlling the closing of said valve.

7. In a fluid pressure brake, the combination with a train pipe, reservoir and brake cylinder, of a triple valve device comprising a main valve means for effecting a service application of the brakes, a vent valve operating in an emergency application of the brakes to release air from the train pipe, an emergency valve mechanism operated by the flow of air from said vent valve to open communication from the reservoir to the brake cylinder, and means for holding said emergency valve open until the pressures of the reservoir and brake cylinder substantially equalize.

8. In a fluid pressure brake, the combination with a train pipe, auxiliary reservoir, brake cylinder and supplemental reservoir, of a triple valve device comprising a main piston and valve for supplying fluid from the auxiliary reservoir to the brake cylinder in service applications of the brakes, a train pipe vent valve, an actuating piston therefor, operated by said main piston under a sudden reduction in train pipe pressure to open said vent valve, an emergency valve device, operated by the flow of air from said vent valve to open communication from the supplemental reservoir to the brake cylinder, and means for holding the emergency valve device in open position until the brake cylinder and supplemental reservoir pressures have substantially equalized.

9. In a fluid pressure brake, the combination with a train pipe, auxiliary reservoir, brake cylinder and supplemental reservoir, of a triple valve device comprising a main piston and valve for supplying fluid from the auxiliary reservoir to the brake cylinder in service applications of the brakes, a train pipe vent valve, an actuating piston therefor contained in and operated by said main piston under a sudden reduction in train pipe pressure to open said vent valve, an emergency valve device, operated by the flow of air from said vent valve to open a communication from said supplemental reservoir to the brake cylinder, and means for holding the emergency valve device in open position until the brake cylinder and supplemental reservoir pressures have substantially equalized.

10. In a fluid pressure brake, the combination with a train pipe, triple valve, and brake cylinder, of a source of fluid pressure, a valve device operating upon a sudden reduction in train pipe pressure for opening communication from said source of fluid pressure to the brake cylinder, and means operated by the flow of fluid from the source of fluid pressure to the brake cylinder for maintaining said valve device in open position.

11. In a fluid pressure brake, the combination with a train pipe, triple valve, auxiliary reservoir, and brake cylinder, of a supplemental source of fluid pressure, a valve device operating upon a sudden reduction in train pipe pressure for opening communication from said supplemental source of fluid pressure to the brake cylinder and having means operated by the flow of fluid from said source to the brake cylinder for maintaining said valve device open.

12. In a fluid pressure brake, the combination with a train pipe and brake cylinder, of a source of fluid pressure, a triple valve device having means operating upon a sudden reduction in train pipe pressure for venting air from the train pipe, a valve mechanism operated by the air vented from the train pipe for opening communication from said source of pressure to the brake cylinder, and means operated by the flow of air from said source to the brake cylinder for maintaining said communication open.

13. In a fluid pressure brake, the combination with a train pipe and brake cylinder, of a source of fluid pressure, a triple valve device having means operating upon a sudden reduction in train pipe pressure for venting air from the train pipe, a valve mechanism operated by the air vented from the train pipe for opening communication from said source of pressure to the brake cylinder and provided with an abutment operated by the flow of fluid from said source of pressure to the brake cylinder for maintaining said communication open, and means adapted to close said communication upon substantial equalization of the fluid from said source into the brake cylinder.

14. In a fluid pressure brake, the combination with a train pipe and brake cylinder, of a source of fluid pressure, a triple valve device having means operating upon a sudden reduction in train pipe pressure for venting air from the train pipe, a valve mechanism operated by the air vented from the train pipe for opening communication from said source of pressure to the brake cylinder and provided with an abutment operated by the flow of fluid from said source of pressure to the brake cylinder for maintaining said communication open, and a spring for closing said communication upon the substantial equalization of the pressure of said source into the brake cylinder.

In testimony whereof I have hereunto set my hand.

WALTER V. TURNER.

Witnesses:
R. F. EMERY,
WM. M. CADY.